US012535137B2

(12) United States Patent
Houtrouw

(10) Patent No.: US 12,535,137 B2
(45) Date of Patent: Jan. 27, 2026

(54) PRESSURE SEAL COUPLING DEVICE, PRESSURE SEAL, DOOR OF AN AIRCRAFT, AND METHOD FOR INSTALLING A PRESSURE SEAL

(71) Applicant: Airbus Operations GmbH, Hamburg (DE)

(72) Inventor: Enno Houtrouw, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/440,317

(22) Filed: Feb. 13, 2024

(65) Prior Publication Data
US 2024/0270370 A1    Aug. 15, 2024

(30) Foreign Application Priority Data

Feb. 14, 2023    (EP) .................................... 23156493

(51) Int. Cl.
*F16J 15/02*    (2006.01)
*B64C 1/14*    (2006.01)
(Continued)

(52) U.S. Cl.
CPC ........... *F16J 15/027* (2013.01); *E06B 7/2309* (2013.01); *B64C 1/14* (2013.01); *E06B 7/23* (2013.01); *F16J 15/46* (2013.01)

(58) Field of Classification Search
CPC .. F16J 15/027; F16J 15/46; E06B 7/23; E06B 7/2309; B64C 1/14
(Continued)

(56) References Cited

U.S. PATENT DOCUMENTS 462,278  A  * 11/1891  Perry .................. B29C 66/1142
                                                        277/631
499,266  A  *  6/1893  Voorhees ............ B29C 66/1282
                                                        277/910
(Continued)

FOREIGN PATENT DOCUMENTS

CN         112682509 A      4/2021
DE      102018127024 B3     10/2019
(Continued)

OTHER PUBLICATIONS

European Search Report for Application No. 23156493 dated Jul. 14, 2023.
(Continued)

*Primary Examiner* — Nicholas L Foster
(74) *Attorney, Agent, or Firm* — KDW Firm PLLC

(57) ABSTRACT

A pressure seal coupling device for coupling first and second seal body end regions of an elongate and at least partially resiliently deformable pressure seal to seal an opening providing access to a pressurizable interior space of an aircraft or spacecraft, when the opening is closed by a closure component. The coupling device includes a first coupling device portion at the first seal body end region and a second coupling device portion at the second seal body end region. The first and second coupling device portions are configured to engage with each other for coupling the first and second seal body end regions. A pressure seal includes such a coupling device, to a door of an aircraft including such a seal arranged on the door, and a method is disclosed for installing a pressure seal.

12 Claims, 6 Drawing Sheets

(51) Int. Cl.
*E06B 7/23* (2006.01)
*F16J 15/46* (2006.01)

(58) Field of Classification Search
USPC .................................. 277/605, 631, 645
See application file for complete search history.

(56) References Cited

U.S. PATENT DOCUMENTS

| | | | | |
|---|---|---|---|---|
| 2,822,192 | A * | 2/1958 | Beatty | F16L 17/10 |
| | | | | 285/97 |
| 2,969,252 | A | 1/1961 | Gruver | |
| 3,245,693 | A * | 4/1966 | Way | F16J 15/32 |
| | | | | 277/910 |
| 3,605,201 | A * | 9/1971 | Peterson | F16G 11/08 |
| | | | | 403/375 |
| 3,642,291 | A * | 2/1972 | Zeffer | F16J 15/46 |
| | | | | 277/583 |
| 3,660,192 | A * | 5/1972 | Smith | F16J 15/108 |
| | | | | 156/122 |
| 3,689,082 | A * | 9/1972 | Satterthwaite | F16J 15/46 |
| | | | | 277/516 |
| 4,159,829 | A * | 7/1979 | Ditcher | B29D 99/0053 |
| | | | | 277/606 |
| 4,508,355 | A * | 4/1985 | Ditcher | F16L 5/10 |
| | | | | 277/606 |
| 4,883,279 | A * | 11/1989 | Sabo | F16C 33/72 |
| | | | | 277/500 |
| 4,988,218 | A * | 1/1991 | Quaglia | F16C 9/04 |
| | | | | 384/473 |
| 5,197,807 | A * | 3/1993 | Kuznar | F01D 25/164 |
| | | | | 277/645 |
| 5,280,927 | A * | 1/1994 | Greisinger | H02G 15/013 |
| | | | | 277/609 |
| 5,312,116 | A * | 5/1994 | Quaglia | F16J 15/164 |
| | | | | 277/910 |
| 5,770,139 | A * | 6/1998 | Kinghorn | A61M 39/12 |
| | | | | 264/234 |
| 5,772,551 | A * | 6/1998 | Mabie | F16G 11/08 |
| | | | | 403/294 |
| 7,165,910 | B2 * | 1/2007 | Sundheimer | F16B 11/008 |
| | | | | 403/292 |
| 7,829,001 | B2 * | 11/2010 | Gladfelter | B29C 66/5261 |
| | | | | 264/296 |
| 7,950,869 | B2 * | 5/2011 | Sundheimer | B29C 65/48 |
| | | | | 403/292 |
| 8,966,824 | B2 * | 3/2015 | Gladfelter | B29C 66/5261 |
| | | | | 49/498.1 |
| 10,012,314 | B2 * | 7/2018 | Becker | F16J 15/56 |
| 11,565,786 | B2 * | 1/2023 | Heeren | B64C 1/14 |
| 11,754,189 | B2 * | 9/2023 | Kung | F16J 15/3284 |
| | | | | 277/583 |
| 12,091,152 | B2 * | 9/2024 | Braga | E06B 7/23 |
| 2007/0018412 | A1 * | 1/2007 | Bono | F16J 15/061 |
| | | | | 277/645 |
| 2008/0164373 | A1 | 7/2008 | Roming | |
| 2014/0259950 | A1 * | 9/2014 | Thompson | E05D 15/36 |
| | | | | 49/466 |
| 2020/0130806 | A1 | 4/2020 | Heeren | |

FOREIGN PATENT DOCUMENTS

GB 885842 A 12/1961
GB 2165898 A 4/1986

OTHER PUBLICATIONS

European Office Action in Application No. 23156493.1, dated Apr. 10, 2025, 5 pages.
European Intention to Grant in EP Application No. 23156493.1 dated Oct. 22, 2025, 47 pages.

* cited by examiner (A - A)

PRESSURE SEAL COUPLING DEVICE, PRESSURE SEAL, DOOR OF AN AIRCRAFT, AND METHOD FOR INSTALLING A PRESSURE SEAL

TECHNICAL FIELD

The disclosure herein relates to the field of pressure seals for sealing an opening providing access to a pressurizable space, in particular a pressurizable interior space of an aircraft or spacecraft. Further, the disclosure herein relates to the field of doors of an aircraft, in particular cargo doors, comprising a pressure seal, and to a method for installing a pressure seal.

BACKGROUND

Even though the disclosure herein may be useful in combination with various pressure seals in a variety of applications, the disclosure herein and the underlying problem will be described in the following in greater detail and exemplary manner with respect to a pressure seal for use on a door, particularly on a cargo door, of an aircraft, but without limiting the disclosure herein to that effect.

Conventional pressure seals for sealing a door of an aircraft, particularly a cargo or freight door, are designed as a closed loop for sealing in the region of a peripheral boundary of the door opening. For this purpose, the pressure seal may be installed on an inner side of the door, in a manner enabling the pressure seal to seal a gap between the closed door and a structure surrounding the opening.

Conventionally, a cargo door of an airplane is pivotably coupled to a fuselage structure adjacent to the door opening by a hinge, for example a so-called piano hinge connected to the door at the upper edge thereof. Furthermore, for the purpose of selectively opening and closing the cargo door, an actuator is connected to the cargo door and the fuselage structure. Also, an electrical connection between electrical systems within the fuselage and the door and/or lines capable of transmitting data or signals between the door and the fuselage may be provided.

In such a conventional sealing system, the pressure seal forms a continuous, closed loop and passes between the upper piano hinge and the location where the actuator, and/or the electrical power or signal supply line(s), is/are connected to the door. A pressure seal installed in this manner works well but is "trapped" between the piano hinge and the actuator and/or electrical power or signal supply.

The pressure seal at the cargo door may be damaged e.g. due to rough handling and/or may be subject to wear over time. A slightly damaged or worn seal can sometimes be repaired using a gluing process, which however requires a considerable minimum curing time of, for instance, 12 to 24 hours, and may require specific environmental conditions, e.g. appropriate temperature and/or humidity.

Further, if the damaged or worn seal has to be replaced by a new one, the actuator and/or the electrical power or signal supply must be disconnected for removing the damaged or worn seal and installing a new seal. This procedure requires special equipment and tools and is time-consuming. For example, the door must be held in position when the actuator is mechanically disconnected. Further, if the seal must be replaced after a longer service time of the aircraft, additional effort may be required particularly for loosening the mechanical connection of the actuator and the door. Also, care must be taken in order to avoid further damage to parts of the mechanical or electrical connection or to surrounding components, and extra efforts for repair of such damages and unplanned ground time may be become necessary. In addition to this, when the new seal has been mounted and the actuator has been connected again to the door, the functioning of the door has to be checked and adjustment of the door may become necessary.

Accordingly, both repairing the seal in situ by gluing and replacing the seal conventionally require considerable work effort and ground time.

Hence, it would be desirable to be able to replace a pressure seal in a simpler and quicker manner, to avoid time-consuming replacement or repair procedures and possible extra working effort, and in particular to bring an aircraft having a damaged or worn pressure seal safely and quickly back into operation.

An aircraft door sealing system is described, for instance, in US 2020/0130806 A1 and DE 10 2018 127 024 B3. The sealing system comprises a sealing element which comprises a sealing member constructed in a tubular manner.

SUMMARY

Against this background, the problem to be solved by the disclosure herein is to simplify the replacement of a pressure seal, and to provide a correspondingly improved pressure seal, an improved door of an aircraft, and an improved method of installing a pressure seal.

In accordance with the disclosure herein, this problem is solved by a pressure seal coupling device and/or by a pressure seal and/or by a door and/or by a method disclosed herein.

Accordingly, the disclosure herein provides a pressure seal coupling device for coupling first and second seal body end regions of an elongate and at least partially resiliently deformable pressure seal. The pressure seal is adapted to seal an opening providing access to a pressurizable space when the opening is closed by a closure component adapted to selectively open and close the opening. The pressurizable space may in particular be a pressurizable interior space of an aircraft or spacecraft. The pressure seal coupling device proposed by the disclosure herein comprises a first coupling device portion at the first seal body end region and a second coupling device portion at the second seal body end region. The first and second coupling device portions are configured to engage with each other for coupling the first and second seal body end regions.

Moreover, a pressure seal for use with a closure component adapted to selectively open and close an opening providing access to a pressurizable space, in particular a pressurizable interior space of an aircraft or spacecraft, is proposed. The pressure seal is elongate and at least partially formed with a resiliently deformable material. The pressure seal comprises a pressure seal coupling device in accordance with the disclosure herein, as well as first and second seal body end regions. The first seal body end region is provided with the first coupling device portion and the second seal body end region is provided with the second coupling device portion.

Furthermore, the disclosure herein provides a door of an aircraft, in particular a cargo door of an aircraft, comprising such a pressure seal arranged on the door along a sealing path, wherein the sealing path in particular comprises a closed loop.

Still further, a method for installing an elongate and at least partially resiliently deformable pressure seal along a sealing path in order to enable the pressure seal to seal an opening providing access to a pressurizable space, in particular a pressurizable interior space of an aircraft or spacecraft, when the opening is closed by a closure component adapted to selectively open and close the opening is proposed. The method includes arranging the pressure seal along the sealing path and coupling a first seal body end region of the pressure seal provided with a first coupling device portion to a second seal body end region of the pressure seal provided with a second coupling device portion. In accordance with the method of the disclosure herein, coupling the first and second seal body end regions includes causing the first and second coupling device portions to engage with each other.

An idea underlying the disclosure herein is that a pressure seal can in this manner be easily and reliably configured as or with a closed loop encircling a component or connection that in turn cannot be easily loosened or removed. By the engaging first and second coupling device portions, the coupling of the seal body end regions is safe, and a seal that is effective in essentially continuous manner also at the joint implemented by the engaging first and second coupling device portions can be obtained. In particular when used for a closure component of an aircraft, e.g. an aircraft door, the pressure seal can be quickly and easily replaced, with little work effort and little expenditure of time, and the possibility of further damage on systems and structural components during the replacement operation is mitigated. Efforts required for adjusting and/or testing the closure component, e.g. door, after seal replacement can also be reduced. Aircraft ground time necessary for seal replacement is thereby reduced. Corresponding advantages are obtained by the method of the disclosure herein.

Advantageous improvements and developments of the disclosure herein are contained in the dependent claims as well as in the description referring to the drawings.

In particular, the first and second coupling device portions are configured to positively engage with each other in order to couple and lock the first and second seal body end regions to each other. In this manner, a reliable coupling of the seal body end regions can be implemented, which in particular also can be released in a relatively simple manner. The positive engagement can contribute to good tightness of the joint implemented by engaging the first and second coupling device portions.

According to a development, the first and second coupling device portions each are resiliently deformable. In this way, tight coupling and easy decoupling of the seal body end regions are made possible in a simple manner.

In accordance with a development, the first coupling device portion is configured to be at least partially inserted into the second coupling device portion. This contributes to a simple and expedient implementation of a positive engagement and to air-tightness at the joint.

According to an improvement, the pressure seal coupling device is configured to fluidically connect a hollow inner region within the first seal body end region and a hollow inner region within the second seal body end region in a pressure-tight manner so that the fluidically connected hollow inner regions can be jointly pressurized relative to at least part of an outer environment of the pressure seal. Hence, the pressure seal is enabled to reliably seal a gap between the closure component and elements surrounding the opening, in particular by being internally pressurized for instance by air pressure on the higher-pressure side with respect to the closure component, also at the location where the first and second seal body end regions are coupled. A good sealing effect is thus obtained at this joint in essentially the same manner as along other portions of the seal body.

In accordance with a development, the first coupling device portion is formed with an extension that extends along an axis away from the first seal body end region, in particular along an axis locally parallel to a sealing path when the pressure seal is installed in order to seal along the sealing path. In this development, the extension comprises at least one first hook-type engagement element, preferably two or more consecutive first hook-type engagement elements, more preferably two consecutive first hook-type engagement elements, on a side of the extension facing radially outwards. Moreover, the extension preferably further comprises an inner passage. This development contributes to engaging the coupling device portions in a safe and easy manner, so that a reliable positive engagement can be obtained.

In particular, the inner passage of the extension is fluidically connected to the hollow inner space of the first seal body end region. This contributes to an expedient implementation of fluid communication across the coupled seal body end regions.

According to an improvement, the extension is rotationally symmetric about the axis along which it extends away from the first seal body end region. This helps to render the extension smooth in the circumferential direction thereof, and further facilitates a tight connection of the first and second seal body end regions.

In a further development, the extension comprises an annular flange at a free end of the extension. The annular flange further contributes to tightly sealing the connection in such a manner that internal pressure within the hollow inner regions of the pressure seal can be reliably maintained without leaking to a lower-pressure environment. Particularly, air present in the hollow inner regions of the seal and having a pressure higher than the pressure on the low-pressure side of the closure component can be kept within the hollow inner regions of the pressure seal without leaking.

The annular flange in particular extends substantially radially. In this way, internal pressure in the hollow inner regions can be even more efficiently used to provide a pressure-tight connection at the joint between the coupled first and second seal body end regions. Further, the annular flange may in particular be substantially flat.

In a development, the second coupling device portion is formed with a passage that extends along an axis into the second seal body end region, in particular along an axis locally parallel to a sealing path when the pressure seal is installed in order to seal along the sealing path, wherein the passage is surrounded by at least one inwardly-facing second hook-type engagement element, preferably by two or more consecutive hook-type engagement elements, more preferably three consecutive hook-type engagement elements. This further contributes to a safe and easy engagement of the first and second coupling device portions.

In accordance with a development, the passage of the second coupling device portion is configured to receive the extension of the first coupling device portion in such a manner that at least one of the first hook-type engagement element(s) and one of the second hook-type engagement element(s), in particular at least two of the first hook-type engagement elements and two of the second hook-type engagement elements, cooperate in order to thereby couple and lock the first and second seal body end regions to each other. Such a coupling is reliable and contributes to expedient implementation of a tight joint between the first and second seal body end regions.

In particular, the passage of the second coupling device portion opens into the hollow inner region of the second seal body end region. In this way, the hollow inner regions of the first and second seal body end regions are fluidically connected via the inner passage of the extension after coupling the seal body end regions.

The annular flange preferably may be configured in such a manner that an outer circumferential edge of the annular flange is capable of abutting against an inner circumferential surface of the hollow inner space of the second seal body end region when the extension, with which the first coupling device portion is formed, is fully inserted into the passage of the second coupling device portion. This further contributes to improved sealing in order to prevent internal pressure inside the seal from escaping.

In a preferred development, the inner passage of the extension is peripherally surrounded by the annular flange.

According to a further development, the outer circumferential edge of the annular flange and the inner passage of the extension may be substantially coaxially arranged. This can further help to uniformly seal the joint between the coupled end sections.

In a preferred development, the closure component is a door which provides access to a pressurizable interior of an aircraft fuselage, in particular a cargo door providing access to a pressurizable cargo hold.

The pressure seal in particular comprises an elongate seal body which is at least partly tubular and resiliently deformable, is provided with the first and second seal body end regions and is adapted to form a closed loop when the first and second seal body end regions are coupled using the first and second coupling device portions. In this manner, a pressure seal capable of sealing along a path in the form of a closed loop can be efficiently formed.

In a development of the disclosure herein, the elongate seal body, the first and second seal body end regions, and the first and second coupling device portions may be formed integrally with each other, in particular from a resiliently deformable material. In this way, a reliable pressure seal can be produced in an expedient manner.

In a further development, the first coupling device portion may be formed integrally with the first seal body end region, in particular from a resiliently deformable material, and the second coupling device portion may be formed integrally with the second seal body end region, in particular from the resiliently deformable material. In this development, the first and second seal body end regions may be produced as pieces separate from an elongate seal body intermediate region and can then be permanently joined to the intermediate region at ends thereof, for instance using an adhesive. The elongate seal body intermediate region preferably is formed from the resiliently deformable material as well.

The resiliently deformable material may in particular be a rubber-type material, for example a synthetic rubber material.

According to a preferred development, the coupling is arranged within a section of the sealing path proximal with respect to a hinge defining a pivot axis of the closure component about which the closure component is adapted to pivot for selectively opening and closing the opening. The hinge may be a so-called piano hinge, but other types of hinges are conceivable. In this manner, the coupling can be positioned in an area of limited deformations, which may be less sensitive to the stiffness behavior of the seal, and where sliding or knife effects are limited, in particular during the process of closing the closure component. This helps to prevent impairment of the function of the coupling, promotes effective sealing and contributes to an improved lifetime of the pressure seal including the coupling. The section within which the coupling is arranged may be a section of the sealing path following an upper edge of the closure component. In particular if the closure component is a cargo door of an aircraft, a section of the sealing path along the upper edge may provide the preferred conditions regarding seal deformation and strain given above.

In particular, the sealing path includes or is formed as a closed loop and the connection formed by engagement of the first and second coupling device portions is formed as part of the closed loop. With such a sealing path, coupling the first and second seal body end regions using the coupling device portions is particularly advantageous.

Further, in an advantageous development, the closed loop surrounds at least one connection location at which the door is coupled, for example mechanically and/or electrically and/or by a data or signal line, to a superordinate structure, for example to an aircraft fuselage structure. In a preferred development of the method, by the step of coupling the first and second seal body end regions using the first and second coupling device portions, the loop formed by the pressure seal following the sealing path is closed around the connection location. Advantageously, in this way, there is no need to disconnect mechanical and/or electrical and/or data/signal connections at the connection location(s) in order to remove and/or install the pressure seal. In particular, replacement of a damaged or worn pressure seal is considerably facilitated.

In an improvement, the method may include, prior to arranging the pressure seal along the sealing path, a step of removing a damaged or worn pressure seal. Removing the worn pressure seal may include, in a preferred development, releasing the engagement of the first and second coupling device portions.

The improvements, developments and enhancements of the disclosure herein may be arbitrarily combined with each other whenever this makes sense. Moreover, other possible enhancements, developments and implementations of the disclosure herein comprise combinations of features of the disclosure herein which have been described above or will be described in the following in relation to the detailed description of embodiments, even where such a combination has not been expressly mentioned.

BRIEF DESCRIPTION OF THE DRAWINGS

The disclosure herein is explained in more detail below with reference to the embodiments shown in the schematic figures.

Figure 1:
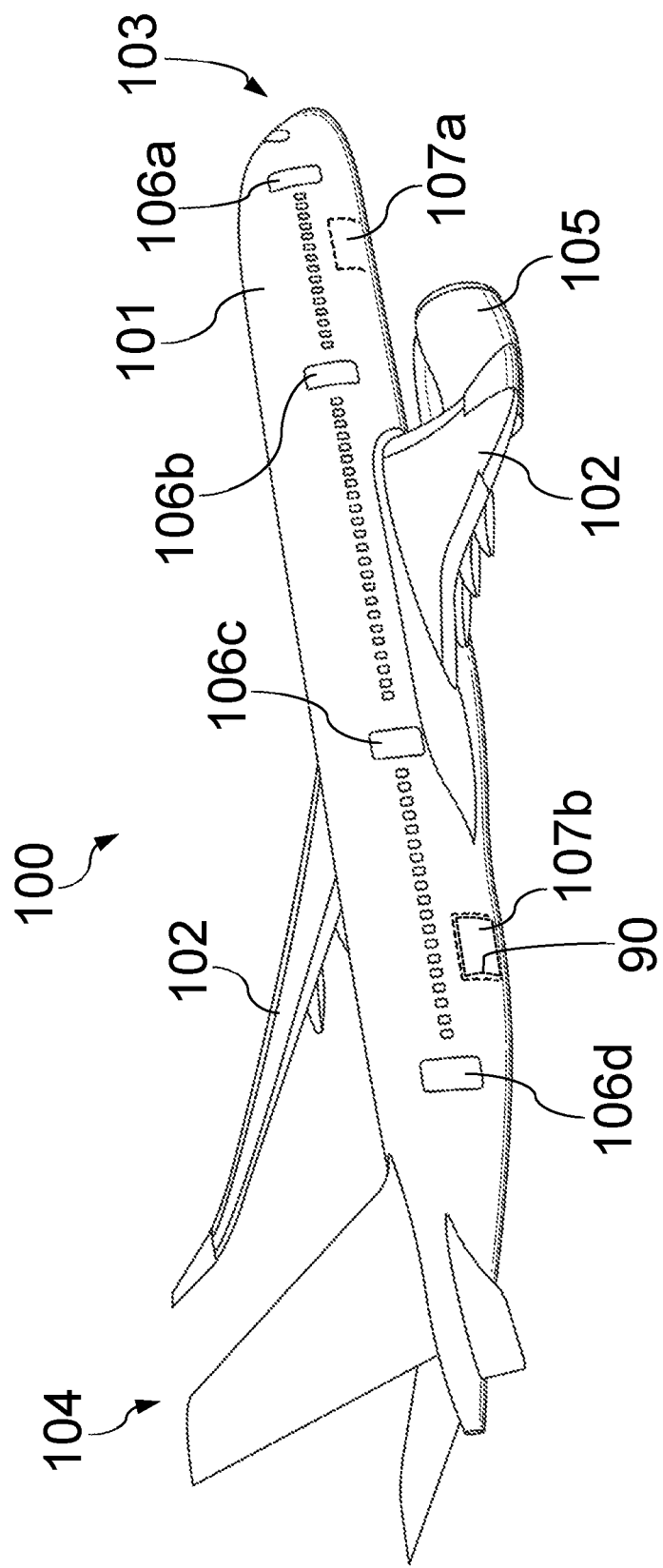
FIG. 1 shows an example aircraft in which embodiments of the disclosure herein may be used.

In the figures of the drawing, elements, features and components which are identical, functionally identical and of identical action are denoted in each case by the same reference designations unless stated otherwise. Elements of the drawings are not necessarily drawn to scale.

DETAILED DESCRIPTION

FIG. 1 shows an example aircraft 100 comprising a fuselage 101, wings 102, a nose 103, an empennage 104 and engines 105 attached to the wings 102. The fuselage 101 is provided with door openings that can be selectively opened and closed by closure components 106a-106d and 107a-107b. Each of the closure components 106a-106d is a passenger door providing access to a passenger cabin inside the fuselage 101. Each of the closure components 107a, 107b is a cargo door that provides access to a cargo hold beneath the passenger cabin floor and inside the fuselage 101. The passenger cabin and the cargo hold can each be pressurized so that an air pressure inside the cabin and cargo hold is higher than an ambient air pressure, i.e. higher than an atmospheric pressure during flight, in particular low atmospheric pressure at cruising altitude. When the aircraft 100 is on the ground, the air pressure inside the cabin and cargo hold usually approximately corresponds to the atmospheric pressure outside the aircraft 100.

Figure 2:
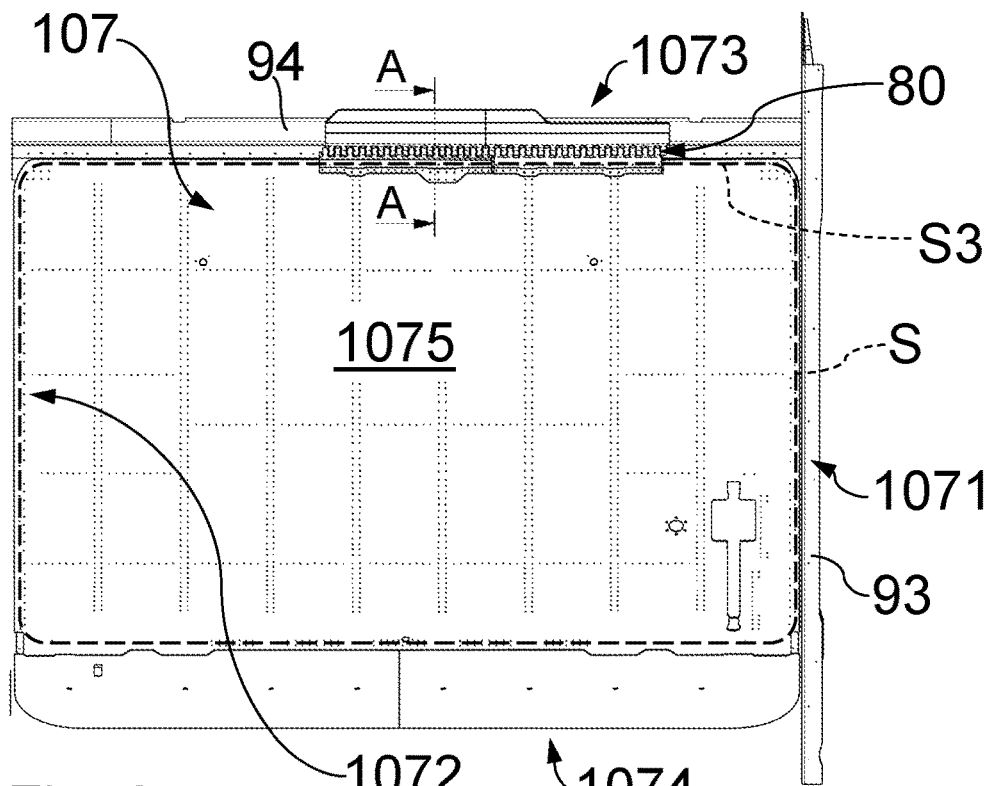
FIG. 2 shows an example cargo door of an aircraft in a front view from an outer side of the cargo door.
Figure 3:
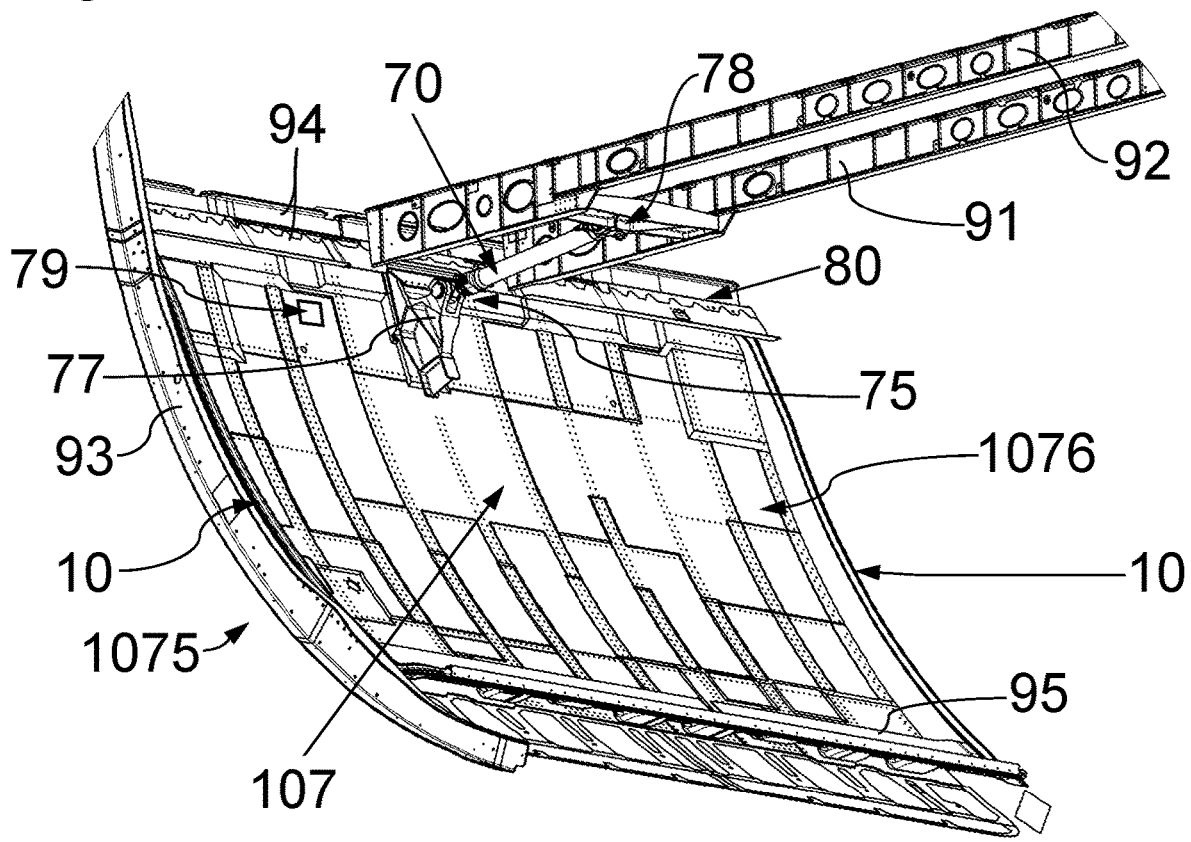
FIG. 3 shows a perspective view of the door of FIG. 2 from an inner side thereof, along with a few fuselage components of the aircraft.
Figure 4:
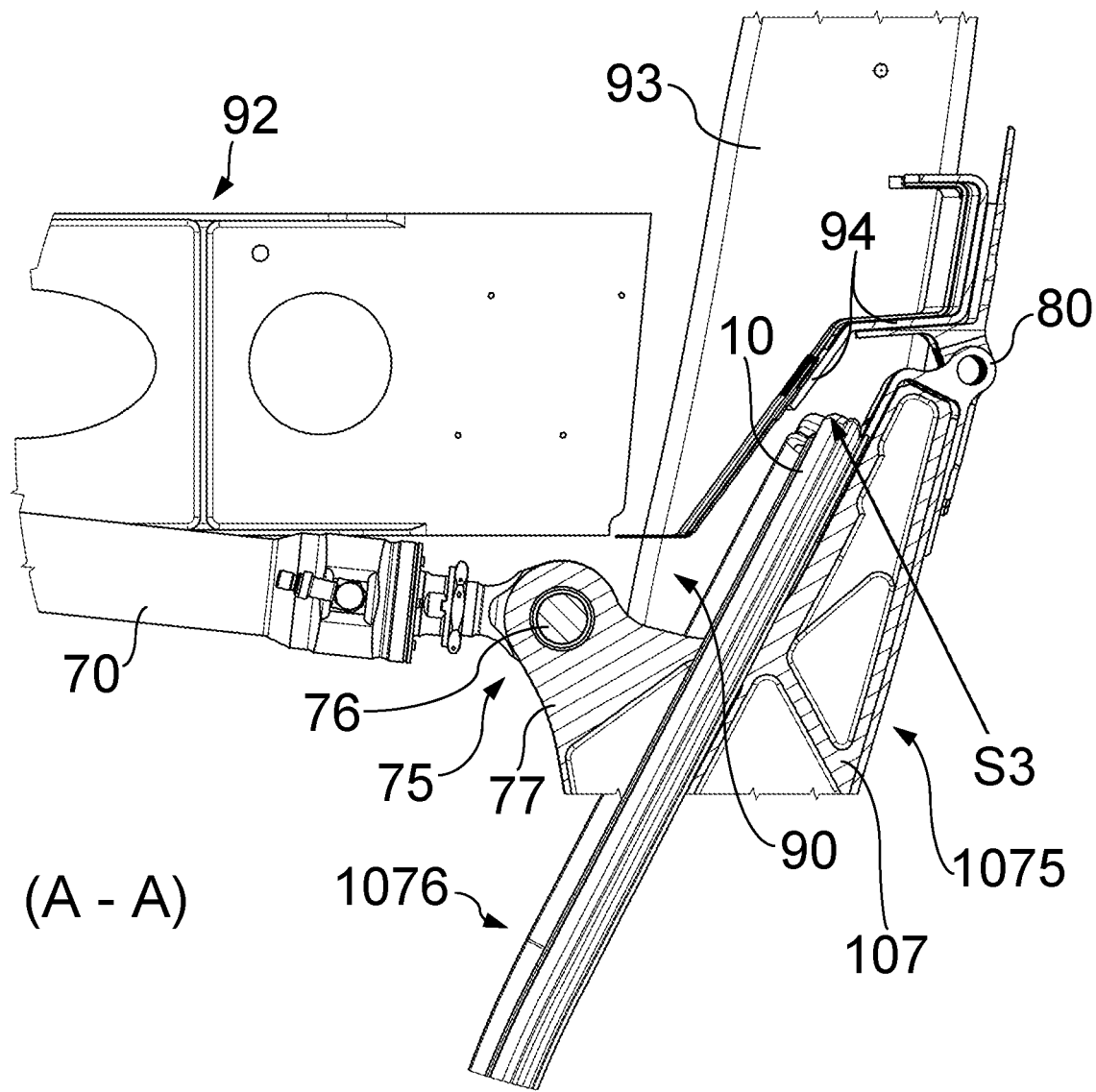
FIG. 4 shows a detail of the example cargo door of FIGS. 2 and 3 in a cross-sectional view A-A indicated in FIG. 2, along with portions of an actuation mechanism and of some fuselage components.

In FIG. 2, a closure component 107 in the form of an aircraft cargo door is shown from an outer side 1075 thereof. The component 107 may e.g. be any of the cargo doors 107a, 107b illustrated in FIG. 1, and is adapted to selectively open and close one of the openings in the fuselage 101 providing access to the cargo hold, e.g. opening 90. A pressure seal 10, not shown in FIG. 2 but displayed in FIGS. 3 and 4, is configured for pressure-tight sealing of a gap between the closed cargo door 107 and structures surrounding the access opening 90, and is arranged on an inner side 1076 of the cargo door 107, following a sealing path S. The sealing path S illustrates where contact between the seal 10 and components of a fuselage structure surrounding the opening 90, or elements attached to these components, is made when the cargo door 107 is fully closed. When the cargo door 107 is closed, the pressure seal 10 is capable of withstanding an air pressure difference between the pressurized interior space, e.g. the cargo hold, of the aircraft 100 and the outside atmosphere, in particular during cruise flight at high altitude, in order to enable maintenance of a chosen air pressure in that interior space. FIG. 2 illustrates the sealing path S by a dashed line. The closure component 107 has four sides 1071-1074, and the path S in sections essentially extends parallel to each of these sides 1071-1074. More specifically, edges of the component 107 on the first side 1071 and the second side 1072 essentially may follow a circumferential direction of the aircraft fuselage 101, while edges of the component 107 on the third side 1073 and fourth side 1074 substantially extend horizontally, parallel to a longitudinal axis of the fuselage 101. In FIG. 2, the third side 1073 is an upper side and the fourth side 1074 a lower side of the component 107 in the closed state thereof.

The closure component 107 is shown in FIG. 3 along with several components 91-95 of the fuselage 101. FIG. 3 shows two transverse beams 91, 92 of the fuselage structure, a frame segment 93 of the fuselage structure, as well as an upper longitudinal profile component 94 and a lower longitudinal profile component 95.

The door opening 90, schematically indicated in FIGS. 1 and 4, also has four sides. The opening 90 is bounded on an upper boundary thereof by the profile component 94, on a lower boundary by the profile component 95, as well as on one of its lateral boundaries by the frame segment 93. On the other lateral boundary, the opening 90 may be bounded by another frame segment, not shown. The pressure seal 10 may be arranged to abut, in order to seal the opening 90 when the closure component 107 is in its closed position, against the profile components 94 und 95 as well as against further components, not shown, attached to the frame segments on both lateral sides, e.g. to frame segment 93.

The pressure seal 10 is elongate, formed from a resiliently deformable material, and installed on the inner side 1076 of the closure component 107 in such a manner that the pressure seal 10 extends along the sealing path S and thereby follows the four sides of the opening 90 when the component 107 closes the opening 90. The pressure seal 10 therefore extends along a closed loop, having four sides, on the inner side 1076 of the cargo door 107.

In order to open and close the opening 90, the closure component 107 is connected to the fuselage structure by a hinge 80, which may be a so-called piano hinge. The hinge 80 defines a pivot axis which is substantially parallel to an edge of the closure component 107 along the upper side 1073 thereof. The closure component 107 is enabled to pivot about the pivot axis defined by the hinge 80 between its fully open and fully closed positions.

The closure component 107 furthermore is connected to the fuselage structure, in the embodiment of FIGS. 2-4 via the transverse beams 91, 92, by a mechanical actuator 70 configured to apply a force to the closure component 107 relative to the fuselage structure, in order to open or close the closure component 107 by pivoting the component 107 about the pivot axis defined by the hinge 80.

From FIGS. 2-4, it can be seen that the sealing path S, which is shaped as a closed, four-sided loop, surrounds a connection location 75 on the inner side 1076 of the closure component 107. At the location 75, the closure component 107 and one end of the actuator 70 are pivotably coupled using a pivot pin 76. The pivot pin 76 is supported by a bracket 77 fixedly attached to structural elements of the closure component 107. At another end of the actuator 70, opposite the connection location 75, the actuator 70 is coupled via a connecting strut to the beams 91 and 92 at a further connection 78.

In addition to the mechanical connection at the location 75, the closure component 107 may also be coupled to the fuselage 101 by lines adapted to transmit electrical power and/or signals or data. In this case, the closed loop defined by the sealing path S may additionally surround a location 79, schematically shown in FIG. 3, where an electrical and/or signal or data connection is implemented.

During the operational life of the aircraft 100, it may occur that replacement of the pressure seal 10 is desirable. The pressure seal 10 in FIGS. 2-4 can be installed and replaced in a rapid and expedient manner, as explained below. In the following, pressure seals 10' and 10" will be described, and it is understood that each of the pressure seals 10' and 10" can be used as the pressure seal 10 shown in FIGS. 2-4.

Figure 7:
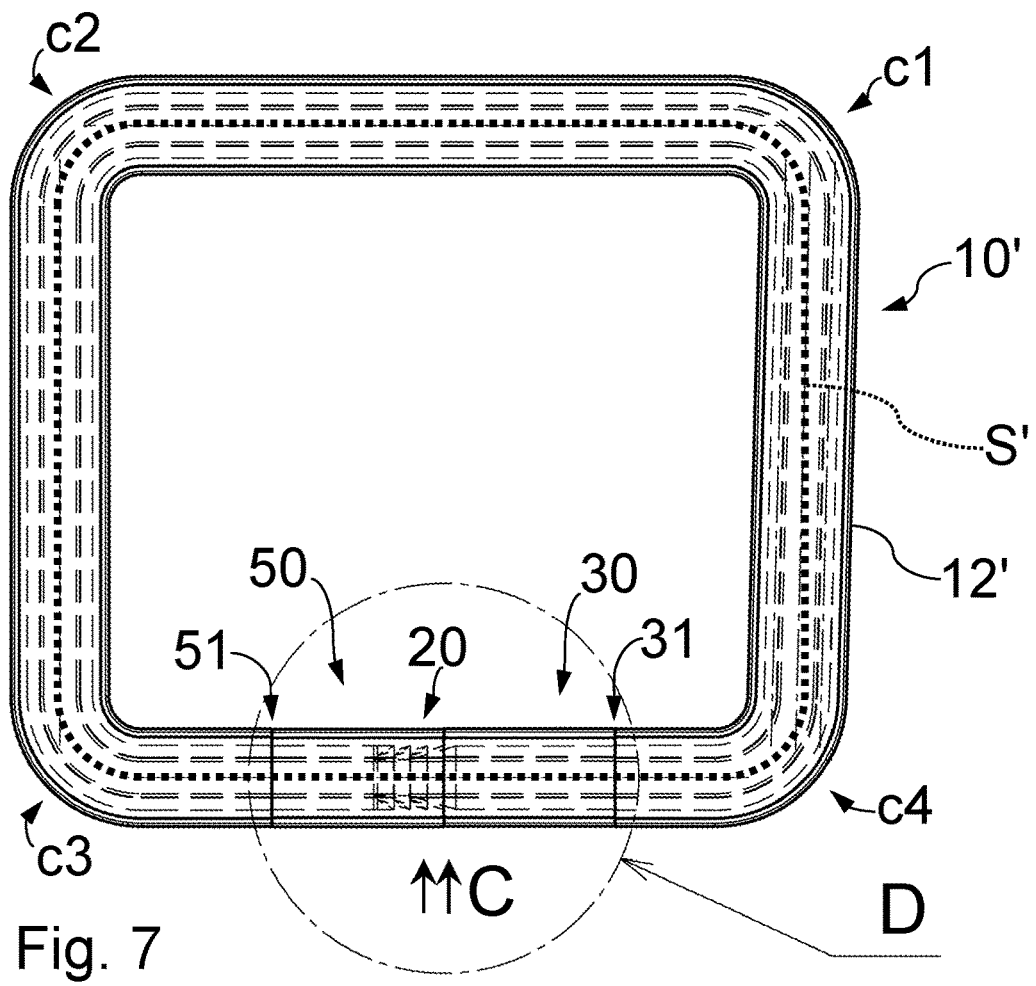
FIG. 7 shows the pressure seal of FIG. 5 in a top view.

In FIGS. 5-9, a pressure seal 10' according to an embodiment is shown, wherein the pressure seal 10' is configured in such a manner that it follows a sealing path S' which is formed as a closed loop, see FIG. 7. Even though the sealing path S' in FIGS. 5-9 has a planar shape, it should be understood that the planar shape has in particular been chosen for simplicity of illustration. The seal 10' may for example be configured to extend along a sealing path formed by a planar closed loop or instead formed by a closed loop that does not or not entirely extend within a plane. As an example, the sealing path S of FIGS. 2-4 is non-planar.

Figure 5:
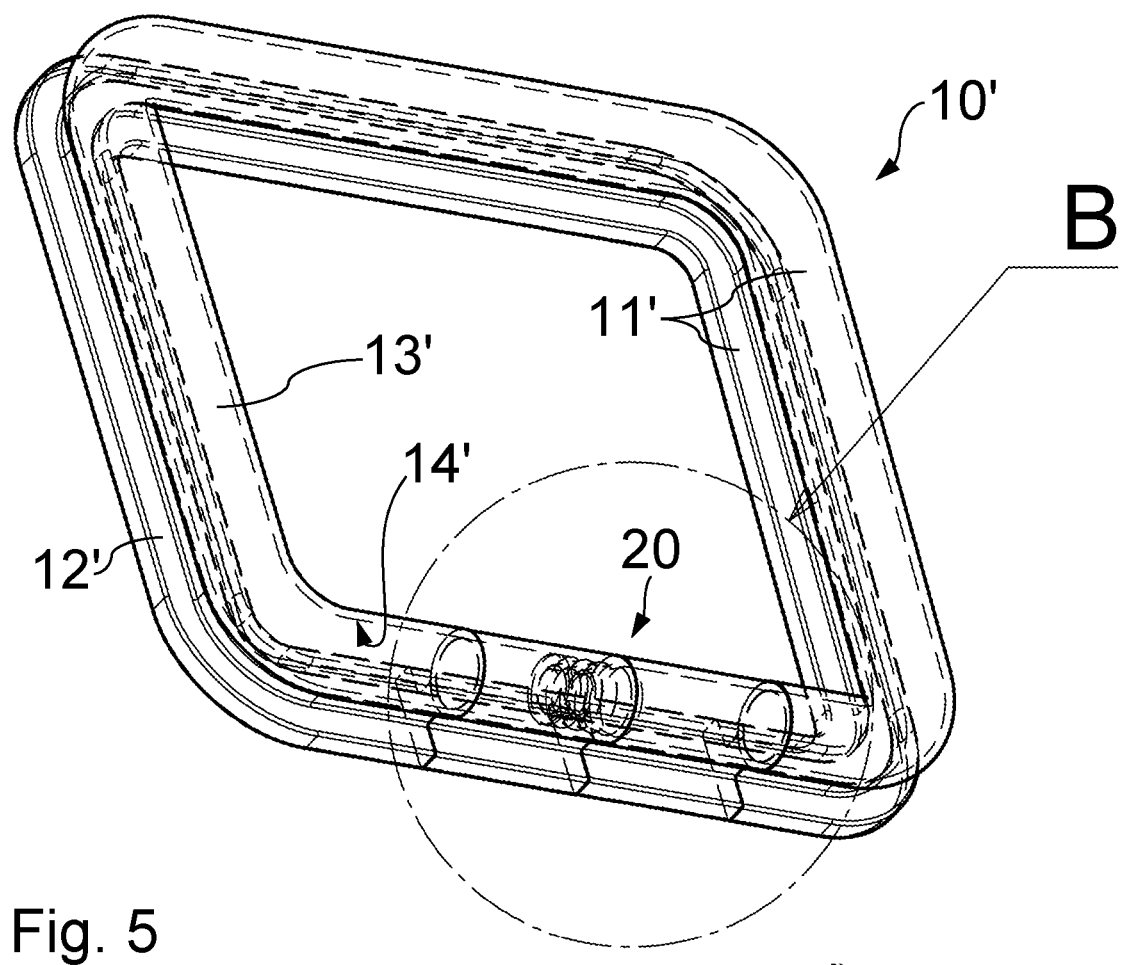
FIG. 5 shows, in a perspective view, an example pressure seal according to an embodiment of the disclosure herein, in which first and second coupling device portions are engaged with each other and the seal follows a sealing path in the form of a closed loop.
Figure 6:
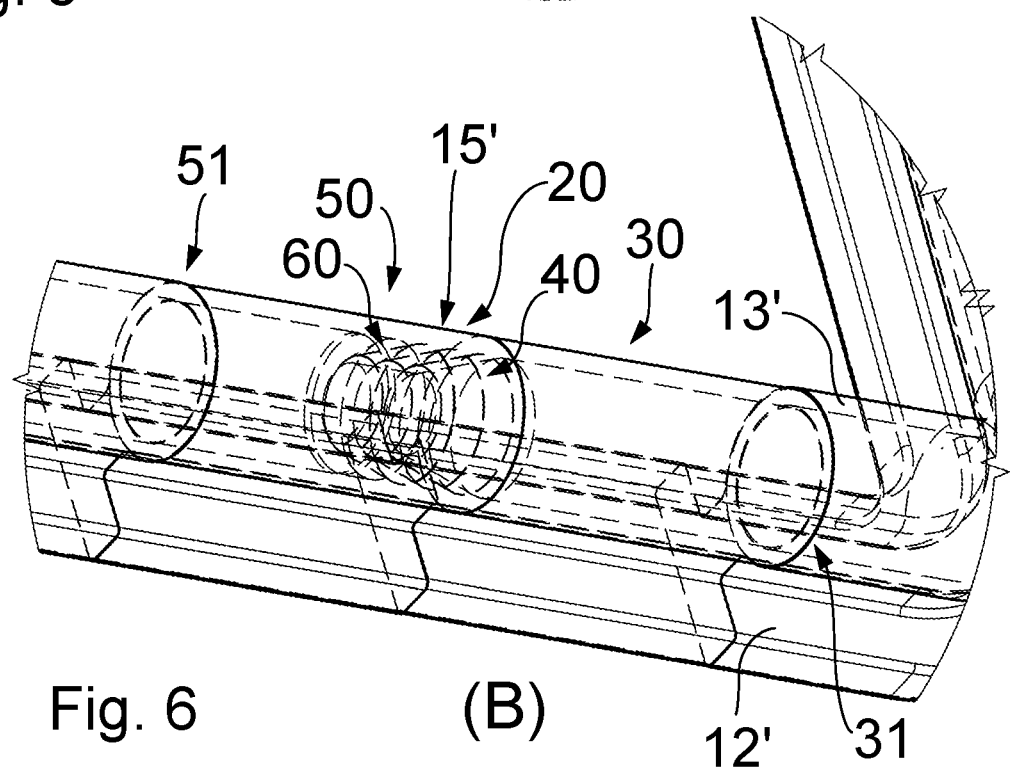
FIG. 6 shows, in perspective view, a detail B of FIG. 5.
Figure 8:
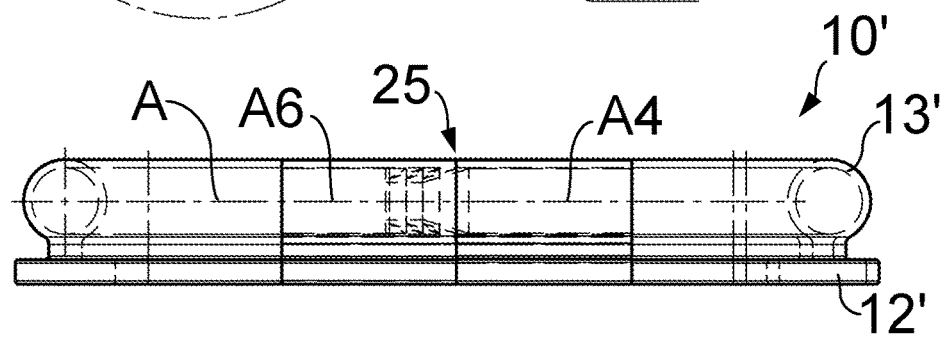
FIG. 8 displays the pressure seal of FIG. 5 in a front view C as indicated in FIG. 7.
Figure 9:
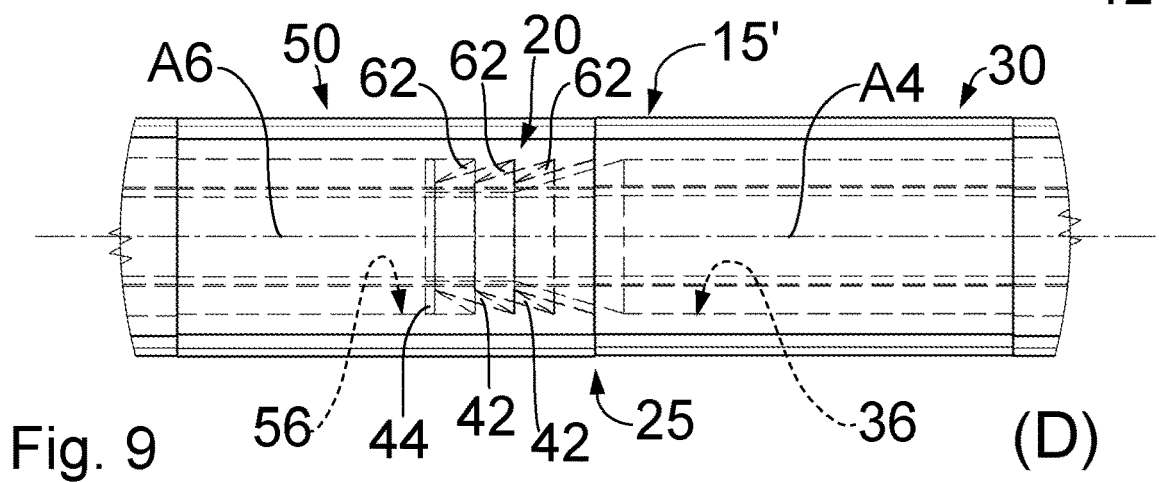
FIG. 9 displays a detail D of the pressure seal of FIG. 5, as indicated in FIG. 7.

Also, in the case of the pressure seal 10', as it is depicted in FIGS. 5, 7 and 8, the extent of the sealing path S' is considerably smaller than the extent of the sealing path S of FIGS. 2-4. It should be understood that the size of the area enclosed by the sealing path S' in FIGS. 5, 7 and 8 has been chosen for simplicity of illustration, and that the sealing path S' may be significantly longer than illustrated, in particular for sealing the cargo door 107 of FIGS. 2-4. Yet, in other embodiments, the sealing path S' may be even shorter than in FIGS. 5, 7, 8.

Furthermore, even though the sealing paths S and S' are each illustrated to be of approximately rectangular shape with rounded corners, many other shapes of the closed loop are conceivable.

The pressure seal 10' comprises an elongate seal body 11', made from a resiliently deformable material, for example from a rubber-type material. The seal body 11' extends along the substantially rectangular path S', see FIG. 7, and includes four rounded corners c1-c4 of the path S'. At the corners c1-c4, an initially straight seal body 11' may either be bent to assume the shape of the path S', or the seal body 11' may already be produced, e.g. molded, to include the rounded shape of the corners c1-c4 and interposed essentially straight sections.

The seal body 11' has a cross-sectional shape that is constant along the length thereof, except for seal body end regions 30 and 50, described in detail below, and possibly with the further exception of deformed corner regions. FIGS. 5-9 show that the seal body 11' is formed with an attachment portion 12', which facilitates attaching and holding the seal 10' on the closure component 107, e.g. using a clamping profile. Within the cross-sectional shape of the seal body 11', the attachment portion 12' has an inverted T-shape. A stem of the T-shape is integrally connected to a resiliently deformable tubular portion 13'. A cross-section of the tubular portion 13' is shaped in the manner of a circular ring. A hollow inner region 14' of the tubular portion 13' is filled with air. In particular when applied to a closure component 107 such as a door of an aircraft, an air pressure inside the hollow inner region 14' may substantially correspond to and may be maintained at an air pressure level inside the cargo hold, or the passenger cabin. In this manner, at cruise altitude for instance, the air pressure inside the hollow inner region 14' is considerably higher than the atmospheric pressure outside the aircraft 100. This promotes efficient, tight sealing of the opening 90. The tubular portion 13' may, for instance, be provided with openings, not shown in the figures, that fluidically connect the pressurizable space accessible via the opening 90, e.g. the cargo hold, to the hollow inner space 14'.

Further, the pressure seal 10' includes a first seal body end region 30 and a second seal body end region 50. The end regions 30 and 50 may be integrally formed with an intermediate section of the seal body 11' as portions of the seal body 11' from the same material. Alternatively, the end regions 30 and 50 may be formed separately, e.g. from the same material as the intermediate section of the seal body 11', and may be fixed at ends of that intermediate section during production of the seal 10', e.g. using adhesive bonding at permanent joints 31, 51.

In order to form a closed loop, in particular for installing the pressure seal 10' along a closed loop around a connection location such as locations 75 and/or 79 in FIGS. 3-4, the first and second seal body end regions 30 and 50 initially form free ends of the seal 10'. After arranging the seal 10' along the sealing path S', the seal body end regions 30, 50 are coupled to each other, in order to close the loop.

For coupling the end regions 30, 50, the pressure seal 10' is provided with a pressure seal coupling device 20, which includes a first coupling device portion 40 provided on the first seal body end region 30 and a second coupling device portion 60 provided on the second seal body end region 50.

The first and second coupling device portions 40 and 60 are configured in such a manner that the coupling device portions 40 and 60 can positively engage with each other for coupling the seal body end regions 30 and 50, and in this manner to releasably lock the first and second seal body end regions 30, 50 to each other.

The end regions 30 and 50, and the intermediate section of the seal body 11', are each formed from a resiliently deformable material, for example from a rubber-type material. The first coupling device portion 40 is integrally formed with the first seal body end region 30, the second coupling device portion 60 is integrally formed with the second seal body end region 50, and the coupling devices portions 40, 60 accordingly each are resiliently deformable.

Figure 10:
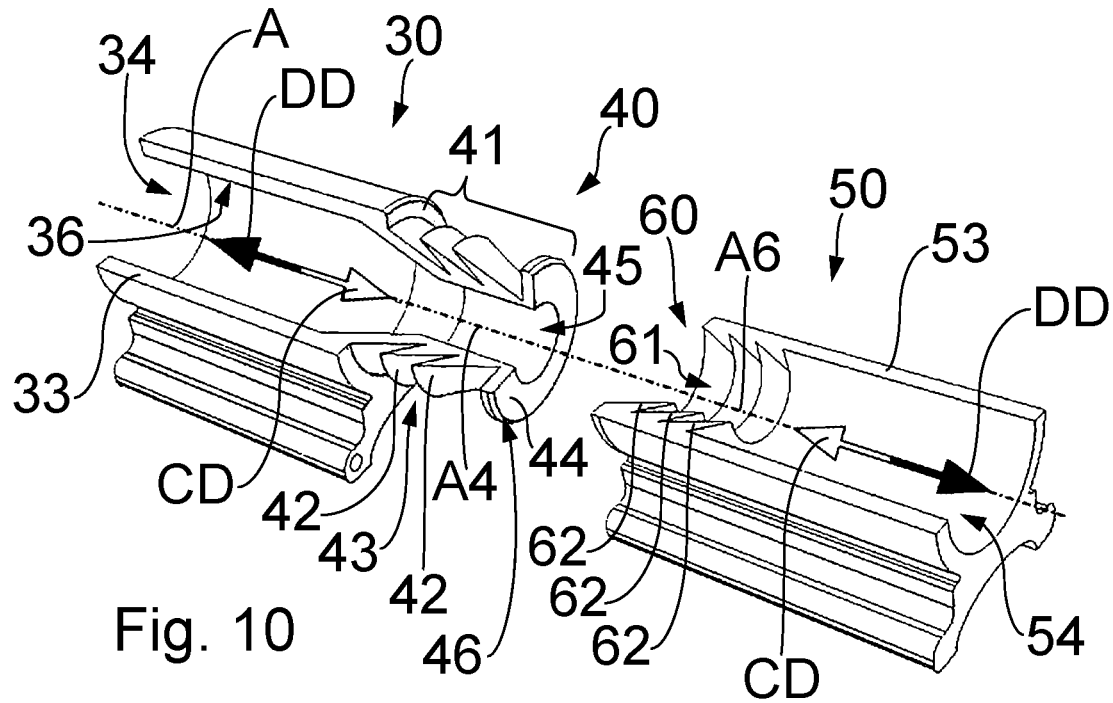
FIG. 10 shows, in a perspective view, first and second seal body end regions of a pressure seal according to an embodiment of the disclosure herein before coupling of the seal body end regions, wherein both of the end regions shown are partially cut away.

The functionality and detailed geometry of the first and second coupling device portions 40 and 60 are explained below with reference to FIGS. 10 and 11, which display seal body end regions 30, 50 of a pressure seal 10" of a further embodiment. The pressure seal 10" differs from the seal 10' only with respect to the cross-sectional shape of the attachment portion 12". The other features of the seal 10" described below, and in particular those of the coupling device 20, are also present in pressure seal 10' of FIGS. 5-9. The description provided above with respect to the seal 10' also applies to the seal 10" of FIGS. 10 and 11.

The first coupling device portion 40 comprises an extension 41 that extends along an axis A4 away from the first seal body end region 30. The axis A4 corresponds to a longitudinal axis of a hollow inner region 34 of the first seal body end region 30. The cross-sectional shape and size of the hollow inner region 34 correspond to those of the hollow inner region 14" of the tubular portion 13". The end region 30 comprises a tubular portion 33 which is formed as a prolongation of the tubular portion 13".

When the pressure seal 10" is installed along the sealing path S", the axis A4 is locally substantially parallel to the sealing path S".

The extension 41 is rotationally symmetric about the axis A4, in the manner of a cylindrical symmetry, and comprises two consecutive first hook-type engagement elements 42 on an outer side 43 of the extension 41 which faces radially outwards. The first hook-type engagement elements 42 are formed as circumferential ribs on the outer side 43 of the extension 41, wherein each of these ribs has a sectional shape that is obliquely inclined backwards and is provided with a pointed outer edge. Outer surfaces of each engagement element 42 are essentially formed from intersecting surfaces of two right circular cones having different apex angles.

Also, the extension 41 is provided with an annular, radially extending, flat flange 44 at a free end of the extension 41. Further, the extension 41 comprises a central inner passage 45 that, at the free end of the extension 41, is peripherally surrounded by flange 44. On a forward peripheral edge, i.e. an outer edge of the flange 44 with respect to the end region 30, the flange 44 can be provided with a small bevel 46. The passage 45 communicates with the hollow inner region 34 and is open at the free end of the extension 41.

The second coupling device portion 60 is formed with a passage 61 that extends along an axis A6 into the second seal body end region 50 from a free end face thereof. The axis A6 corresponds to a longitudinal axis of a hollow inner space 54 of the second seal body end region 50, and the passage 61 opens into the hollow inner region 54. The cross-sectional shape and size of the hollow inner region 54 correspond to those of the hollow inner region 14" of the tubular portion 13" as well. The end region 50 comprises a tubular portion 53 which is formed as a prolongation of the portion 13" as well.

When the pressure seal 10" is installed along the sealing path S", the axis A6 is locally substantially parallel to the sealing path S".

The passage 61 of the second coupling device portion 60 is surrounded by three consecutive hook-type engagement elements 62, which are formed as circumferentially extending, radially inwardly protruding ribs. A sectional shape of each rib 62 is obliquely inclined forward and inward, in the direction of the hollow inner region 54, and has a pointed free edge. Each engagement element 62 has a surface formed from intersecting surfaces of two right circular cones having different apex angles. The sectional shape of the engagement elements 62 is selected so as to enable positive, tightly fitting engagement with the engagement elements 42.

The passage 61 is configured to receive the extension 41. In order to couple the end regions 30 and 50, the end regions 30 and 50 are arranged relative to each other in such a way that the axes A4 and A6 coincide as an axis A. The extension 41 is then inserted into and partially through the passage 61 of the second seal body end region 50. As both end regions 30, 50 are formed from a resiliently deformable material, the first and second hook-type engagement elements 42, 62 as well as the flange 44 can elastically deform during the insertion step. When the insertion of the extension 41 is complete, see FIG. 11, the flange 44 and both first hook-type engagement elements 42 each positively engage a respective one of the second hook-type engagement elements 62. The corresponding slanted sectional shapes of the first and second engagement elements 42, 62 facilitate the coupling and positive locking of the end regions 30, 50 to each other. The insertion of the extension 41 is additionally facilitated by the forward bevel 46 of the annular flange 44. FIG. 10 indicates the coupling directions CD in which the end sections 30, 50 are moved for coupling.

By engaging the first and second coupling device portions 40, 60 with each other, the end portions 30, 50 are mechanically coupled and locked to each other at a joint 25. Decoupling the end portions 30, 50 again can be accomplished by pulling the end portions 30, 50 along decoupling directions DD, see FIG. 10.

Figure 11:
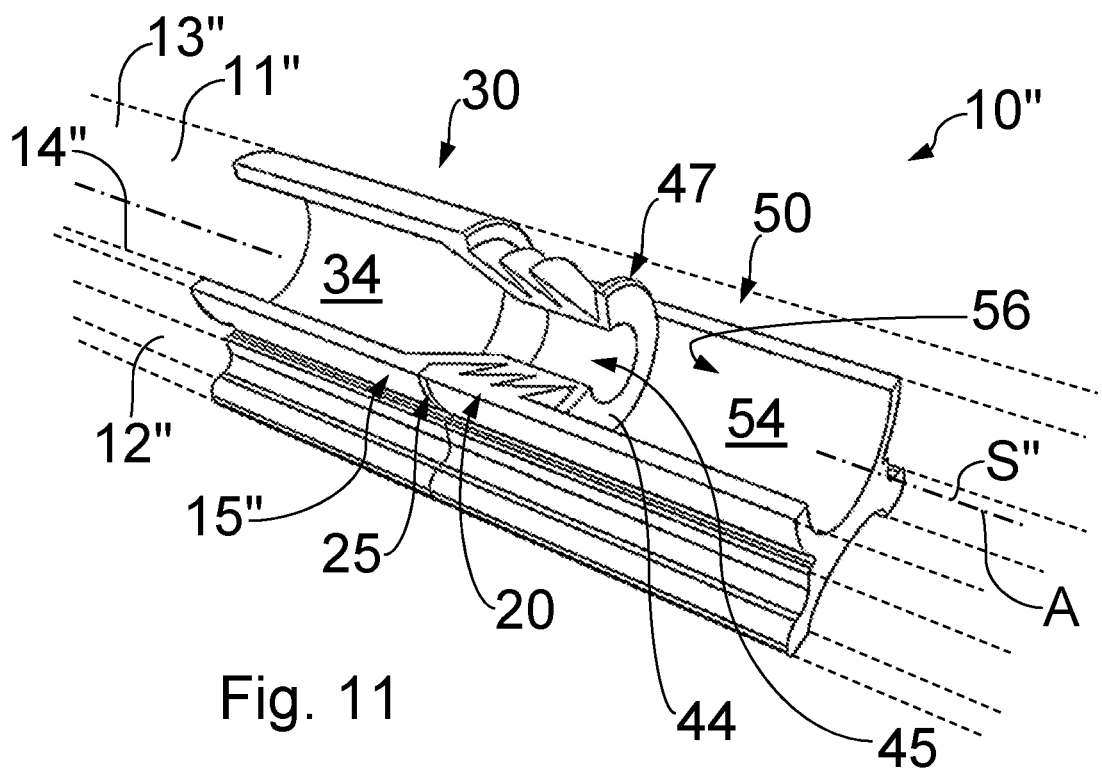
FIG. 11 shows the seal body end regions of FIG. 10 after coupling.

In the coupled state, shown in FIG. 11 for the seal 10", an outer surface 15" of the seal 10" is substantially continuous, also at the joint 25. A continuous hollow inner space 34, 14", 54 extends from the first seal body end portion 30 all along the seal body 11" to the second seal body end portion 50.

Moreover, in the coupled state, the hollow inner regions 34 and 54 are fluidically connected to each other via the passage 45, which fluidically communicates with each of the hollow inner spaces 34 and 54. Accordingly, an internal air pressure higher than the outside atmospheric pressure can be applied in a continuous, substantially uniform manner along the entire length of the sealing path S" and in particular also in the region of the joint 25, and the spaces 34, 54 and 14" and the passage 45 can be jointly and continuously pressurized relative to a low-pressure side of the outer environment.

When the end regions 30, 50 of the pressure seal 10, 10', 10" are coupled, the joint 25 is pressure-tight and prevents unwanted escape of internal pressure within the inner spaces 34, 54 as well as 14, 14', 14" toward the low-pressure side, specifically toward the outside atmosphere surrounding aircraft 100. Such tightness is achieved by the interacting and correspondingly shaped first and second hook-type engagement elements 42 and 62, and also by the annular flange 44. The flange 44 extends substantially radially, whereby the flange 44 can be caused to tightly abut against the innermost of the second hook-type engagement elements 62. Further, an outer circumferential edge 47 of the flange 44 tightly abuts against a cylindrical surface 56 defining the hollow inner region 54, see FIGS. 11 and 9, which also show a cylindrical surface 36 defining the hollow inner space 34. The edge 47 and the passage 45 are substantially coaxial.

In a method for installing the pressure seal 10, 10', 10", the pressure seal 10, 10', 10" is arranged so as to follow the pre-defined sealing path S, S', S". At this stage, the pressure seal 10, 10', 10" still forms an open loop, but the end regions 30, 50 are already arranged adjacent to each other. Then, the joint 25 is formed by coupling the seal body end regions 30, 50 by the first and second coupling device portions 40 and 60, which are brought into positive engagement as described above and form the coupling device 20. For forming the joint 25, no adhesive is used, so that the seal body end regions 30, 50 are not joined using any adhesive bonding, but via the engagement of the coupling device portions 40, 60 alone. Therefore, the end regions 30, 50 can be comparatively easily separated if required, and lengthy curing of adhesive is avoided.

In this way, the pressure seal 10, 10', 10" can be arranged in a simple manner along a closed loop and around another element, for example around the connection location 75, where disconnecting the actuator 70 by removing the pivot pin 76 would require considerable effort and work as well as suitable tools. Also, disconnecting electrical or data connections at 79 can be avoided. Mounting the pressure seal 10, 10', 10" on the closure component 107 is therefore considerably simplified.

Also, in this manner, a pressure seal can be easily replaced. For example, it may be desired to replace a pressure seal on the closure component 107, formed as a cargo door of the aircraft 100, due to wear after a considerable time of operation. The joint 25 of the seal 10, 10', 10" can be opened in a simple manner, thus opening the closed loop around the connection location 75 and/or 79, and the worn seal 10, 10', 10" can be easily removed without removing the pivot pin 76. FIG. 10 shows the decoupling directions DD in which the end sections 30, 50 are moved for releasing the engagement of portions 40, 60 and opening the loop. Then, possibly after additional preparatory steps such as cleaning or the like, a new seal 10, 10', 10" can be quickly and reliably installed as described above.

Referring to FIG. 4 again, preferably, when the pressure seal 10, 10', 10" is used on the closure component 107 formed as the cargo door, the joint 25 formed using the coupling device 20 is arranged within an upper section S3 of the sealing path S. The section S3 is proximal with respect to the hinge 80, extends close to the hinge 80 on the upper side 1073, and passes between the connection location 75 and the hinge 80 as well as between location 79 and the hinge 80. Further preferably, the joint 25 is positioned so as to be laterally offset in particular with respect to the bracket 77 and thus to the connection location 75. In this way, better accessibility to the joint 25 can be provided. By placing the joint 25 within the section S3, the coupling 20 is exposed to only limited deformation and to limited or no sliding or knife effects. Also, less sensitivity to the stiffness behaviour of the seal may be present in section S3.

Although the disclosure herein has been completely described above with reference to preferred embodiments, the disclosure herein is not limited to these embodiments but may be modified in many ways.

For instance, even though a rotationally symmetric shape of the interacting portions of the coupling device is preferred, the disclosure herein is not limited to such a shape. Further, the tubular portion of the seal body may in advantageous embodiments, as described above, be formed with an essentially circular inner and outer cross-sectional shape, but other hollow cross-sectional shapes are conceivable.

Moreover, even though embodiments of the disclosure herein have been described above in which a pressure seal 10, 10' or 10" is used to provide a sealing function on an aircraft cargo door as the closure component 107, 107*a-b*, embodiments in which the pressure seal 10, 10' or 10" is used on a passenger door, such as one of passengers doors 106*a*-106*d*, are also conceivable and may be useful.

Further, although in embodiments described above, the seal 10, 10', 10" is mounted on the closure component, e.g. 107, 107*a-b*, the pressure seal 10, 10' or 10" may instead be installed on the fuselage along the boundary of the opening 90.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10, 10', 10" pressure seal
11', 11" seal body
12', 12" attachment portion
13', 13" tubular portion
14', 14" hollow inner region (tubular portion)
15', 15" outer surface
20 coupling device
25 joint
30 first seal body end region
31 permanent joint
33 tubular portion
34 hollow inner region
35 surface (hollow inner region 34)
36 cylindrical surface
40 first coupling device portion
41 extension
42 first hook-type engagement element
43 outer side (extension)
44 annular flange (extension)
45 inner passage
46 bevel
47 circumferential edge
50 second seal body end region
51 permanent joint
53 tubular portion
54 hollow inner region
55 surface (hollow inner region 54)
56 cylindrical surface
60 second coupling device portion
61 passage
62 second hook-type engagement element
70 actuator
75 connection location
76 pivot pin
77 bracket
78 further connection
79 connection location (electrical and/or data connection)
80 hinge
90 opening
91 transverse beam
92 transverse beam
93 frame segment
94 upper profile component
95 lower profile component
100 aircraft
101 fuselage
102 wing
103 nose
104 empennage
105 engine
106*a-d* closure component
107 closure component
107*a,b* closure component
1071 first side (closure component)
1072 second side (closure component)
1073 third side (closure component)
1074 fourth side (closure component)
1075 outer side (closure component)
1076 inner side (closure component)
A axis
A4 axis
A6 axis
c1, c2 corner
c3, c4 corner
CD coupling direction
DD decoupling direction
S, S', S" sealing path
S3 upper section (sealing path)

The invention claimed is:

1. A pressure seal comprising:
a first seal body end region and a second seal body end region, and wherein the pressure seal is elongate, at least partially resiliently deformable, and configured to seal an opening providing access to a pressurizable interior space of an aircraft or spacecraft, when the opening is closed by a closure component configured to selectively open and close the opening,
wherein the pressure seal further comprises a pressure seal coupling device comprising:

a first coupler permanently attached at a first permanent joint to the first seal body end region; and a second coupler permanently attached at a second permanent joint to the second seal body end region;

wherein the first coupler comprises an extension that extends along an axis away from the first seal body end region, along an axis locally parallel to a sealing path when the pressure seal is installed in order to seal along the sealing path, the extension comprising:

on an outer surface of the extension, a plurality of circumferential ribs that extend radially outwards from the outer surface of the extension and are spaced apart from each other along a length of the first coupler;

a flat, annularly-shaped flange at a terminal end of the extension opposite from where the extension is attached to the first seal body end region; and a central inner passage that is internal to the extension and opens, on a first end thereof, into a hollow inner region of the first seal body end region;

wherein the second coupler comprises:

a longitudinally extending passage that is internal to the second coupler and opens, on a first end thereof, into a hollow inner region of the second seal body end region; and a plurality of circumferential ribs that extend radially inwardly from an inner surface of the longitudinally extending passage and are spaced apart from each other along a length of the second coupler;

wherein the longitudinally extending passage of the second coupler is configured to receive therein the extension of the first coupler to provide a fluidic connection between the hollow inner region within the first seal body end region and the hollow inner region within the second seal body end region, so that the fluidically connected hollow inner regions can be jointly pressurized relative to at least part of an outer environment of the pressure seal;

wherein the flange has an outer radius that is greater than an internal radius of the longitudinally extending passage of the second coupler; and wherein a length of the extension of the first coupler is greater than a length of the plurality of circumferential ribs, such that, when the extension of the first coupler is fully inserted into the longitudinally extending passage of the second coupler, the flange is positioned longitudinally beyond a longitudinally innermost one of the plurality of circumferential ribs.

2. The pressure seal according to claim 1, wherein the first and second couplers are configured to positively engage with each other to couple and lock the first and second seal body end regions to each other.

3. The pressure seal according to claim 1, wherein the first and second couplers each are resiliently deformable.

4. The pressure seal according to claim 1, wherein:

each of the plurality of ribs of the first coupler has a sectional shape that is obliquely inclined backwards, in a direction opposite an insertion direction, which is a direction in which the first coupler is inserted into the second coupler;

each of the plurality of ribs of the second coupler has a sectional shape that is obliquely inclined forwards, in a same direction as the insertion direction; and each of the plurality of ribs of the first coupler and the second coupler have a pointed free edge.

5. The pressure seal according to claim 4, wherein:

the sectional shape of each of the plurality of ribs of the first coupler is formed from surfaces of two right circular cones that have different apex angles and intersect at the pointed free edge thereof;

the sectional shape of each of the plurality of ribs of the second coupler is formed from surfaces of two right circular cones that have different apex angles and intersect at the pointed free edge thereof; and the sectional shape of each of the plurality of ribs of the second coupler is selected to enable positive, tightly fitting engagement with the plurality of ribs of the first coupler.

6. The pressure seal according to claim 5, wherein:

the extension and the plurality of ribs that extend radially outward from the outer surface of the extension are rotationally symmetric about the axis along which the extension extends away from the first seal body end region; and the longitudinally extending passage and the plurality of ribs that extend radially inward from the inner surface of the longitudinally extending passage are rotationally symmetric about a longitudinal axis of the longitudinally extending passage.

7. The pressure seal according to claim 1, wherein the flange comprises, on an end of the flange that is first inserted into the longitudinally extending passage of the second coupler, a beveled surface that extends around an entire outer circumference of the flange to aid in insertion of the flange into the longitudinally extending passage of the second coupler.

8. The pressure seal according to claim 1, wherein:

the first coupler is permanently attached to the first seal body end region at the first permanent joint using an adhesive; and the second coupler is permanently attached to the second seal body end region at the second permanent joint using the adhesive.

9. The pressure seal according to claim 1, wherein:

the first coupler is permanently attached to the first seal body end region at the first permanent joint to form a unitary structure, such that the first coupler and the first seal body end region are formed from a same material; and the second coupler is permanently attached to the second seal body end region at the second permanent joint to form a unitary structure, such that the second coupler and the second seal body end region are formed from a same material.

10. The pressure seal according to claim 9, wherein the same material from which the first coupler, the second coupler, the first seal body end region, and the second seal body end region are all formed comprises rubber.

11. A door or cargo door of an aircraft comprising the pressure seal according to claim 1, which is arranged on the door along the sealing path, wherein the sealing path comprises a closed loop.

12. A method for installing the pressure seal according to claim 1, the method comprising:

arranging the pressure seal along the sealing path; and coupling the first seal body end region of the pressure seal to the second seal body end region of the pressure seal;

wherein coupling the first and second seal body end regions includes causing the first and second couplers to engage with each other.

* * * * *